United States Patent
Rea et al.

(10) Patent No.: US 11,541,820 B2
(45) Date of Patent: Jan. 3, 2023

(54) ACTUATOR FOR A VEHICLE COMPARTMENT

(71) Applicant: Faurecia Interior Systems, Inc., Auburn Hills, MI (US)

(72) Inventors: Julien Rea, Sunnyvale, CA (US); Cedric Ketels, Mountain View, CA (US); Justin Landowne, Auburn Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 323 days.

(21) Appl. No.: 16/834,169

(22) Filed: Mar. 30, 2020

(65) Prior Publication Data

US 2021/0300253 A1 Sep. 30, 2021

(51) Int. Cl.
| | |
|---|---|
| *B60R 7/06* | (2006.01) |
| *E05B 47/02* | (2006.01) |
| *E05C 5/00* | (2006.01) |
| *E05C 9/04* | (2006.01) |

(52) U.S. Cl.
CPC ............. *B60R 7/06* (2013.01); *E05B 47/02* (2013.01); *E05C 5/00* (2013.01); *E05C 9/043* (2013.01)

(58) Field of Classification Search
CPC . B60R 7/06; E05B 47/02; E05B 83/28; E05B 83/30; E05C 5/00; E05C 9/043; E05C 9/00; E05C 9/02; E05C 9/04; Y10T 292/0834; Y10T 292/0846; Y10T 292/0845; Y10T 292/1021
See application file for complete search history.

(56) References Cited

U.S. PATENT DOCUMENTS

| | | | | |
|---|---|---|---|---|
| 3,873,881 | A |   | 3/1975 | Inoue |
| 4,806,815 | A | * | 2/1989 | Honma ............... H01H 71/145 337/140 |
| 5,531,086 | A | * | 7/1996 | Bryant ............... E05B 63/0004 70/279.1 |
| 6,192,723 | B1 | * | 2/2001 | Brownell, Sr. ..... E05B 47/0002 70/279.1 |
| 6,574,958 | B1 | * | 6/2003 | MacGregor ............. G12B 1/00 60/527 |

(Continued)

FOREIGN PATENT DOCUMENTS

| | | | | | |
|---|---|---|---|---|---|
| CN | 102170765 | A | * | 8/2011 | ............. E05B 17/22 |
| DE | 10349032 | | | 5/2005 | |

(Continued)

OTHER PUBLICATIONS

Badescu et al., Compact, Low-Force, Low-Noise Linear Actuator, Tech Briefs, Oct. 1, 2012, available at https://www.techbriefs.com/component/content/article/tb/techbriefs/mechanics-and-machinery/14923, 3 pages.

(Continued)

*Primary Examiner* — Kristina R Fulton
*Assistant Examiner* — Steven A Tullia
(74) *Attorney, Agent, or Firm* — Barnes & Thornburg LLP

(57) ABSTRACT

A vehicle includes a compartment mounted to a frame of the vehicle. The compartment includes a box coupled to the frame in a fixed position relative to the frame and a latch system coupled to the box to allow a user to access the box. The latch system includes a shape-memory alloy wire guided by a pulley during actuation of the latch system.

20 Claims, 4 Drawing Sheets

(56) References Cited

U.S. PATENT DOCUMENTS

| | | | |
|---|---|---|---|
| 7,364,211 B2* | 4/2008 | Niskanen | E05B 81/00 |
| | | | 292/216 |
| 7,380,843 B2 | 6/2008 | Alacqua | |
| 7,500,704 B2 | 3/2009 | Herrera | |
| 7,555,900 B1* | 7/2009 | Vallance | F03G 7/065 |
| | | | 60/528 |
| 7,764,159 B2* | 7/2010 | Zanella | F03G 7/065 |
| | | | 337/140 |
| 7,766,409 B2 | 8/2010 | Ohnuki | |
| 7,832,239 B2 | 11/2010 | Akihiko | |
| 7,878,035 B2 | 2/2011 | Yamaguchi | |
| 8,393,652 B2* | 3/2013 | Szilagyi | E05B 83/16 |
| | | | 292/201 |
| 8,443,600 B2 | 5/2013 | Butera | |
| 8,505,987 B2 | 8/2013 | Browne | |
| 8,596,704 B2 | 12/2013 | Sielhorst | |
| 8,706,305 B2* | 4/2014 | Jiang | G05D 15/01 |
| | | | 700/275 |
| 8,756,933 B2* | 6/2014 | Topliss | G03B 3/10 |
| | | | 60/527 |
| 8,915,524 B2 | 12/2014 | Charnesky | |
| 9,316,031 B2 | 4/2016 | Abe | |
| 10,364,593 B2* | 7/2019 | Alexander | E05B 85/20 |
| 2005/0023086 A1 | 2/2005 | Szilagyi | |
| 2005/0184533 A1* | 8/2005 | Hebenstreit | F16D 63/006 |
| | | | 292/201 |
| 2007/0175213 A1* | 8/2007 | Featherstone | F03G 7/065 |
| | | | 60/527 |
| 2008/0007081 A1 | 1/2008 | Shibata | |
| 2008/0022674 A1* | 1/2008 | Brown | F03G 7/065 |
| | | | 60/527 |
| 2008/0100079 A1 | 5/2008 | Herrera | |
| 2008/0271559 A1* | 11/2008 | Garscha | F03G 7/065 |
| | | | 74/469 |
| 2009/0301077 A1* | 12/2009 | Takahashi | F03G 7/065 |
| | | | 60/528 |
| 2010/0071424 A1* | 3/2010 | Tsuruta | E05B 83/30 |
| | | | 70/91 |
| 2012/0187128 A1* | 7/2012 | Weber | E05B 47/0009 |
| | | | 292/138 |
| 2013/0043691 A1* | 2/2013 | Marz | F03G 7/06 |
| | | | 292/144 |
| 2013/0305705 A1 | 11/2013 | Ac | |
| 2014/0210219 A1* | 7/2014 | Pipp | E05C 1/12 |
| | | | 292/144 |
| 2015/0300055 A1* | 10/2015 | Alexander | E05C 19/022 |
| | | | 292/195 |
| 2017/0058577 A1* | 3/2017 | Ben Abdelaziz | E05B 81/56 |
| 2018/0106079 A1 | 4/2018 | Alacqua | |
| 2018/0371795 A1 | 12/2018 | Nakasone | |
| 2019/0234120 A1* | 8/2019 | Flaute | E05B 13/101 |
| 2020/0002978 A1 | 1/2020 | Ketels | |
| 2020/0002979 A1 | 1/2020 | Ketels | |
| 2020/0002980 A1 | 1/2020 | Ketels | |
| 2020/0040609 A1* | 2/2020 | Alexander | E05B 81/04 |

FOREIGN PATENT DOCUMENTS

| | | | | |
|---|---|---|---|---|
| DE | 102010009690 A1 | | 12/2010 | |
| DE | 102010030645 A1 | | 7/2011 | |
| DE | 102010030645 B4 | | 7/2011 | |
| DE | 102012000913 A1 | * | 7/2013 | B60R 1/074 |
| DE | 102012000913 A1 | | 7/2013 | |
| FR | 2655598 | | 6/1991 | |
| FR | 3021686 A1 | * | 12/2015 | E05B 81/56 |
| KR | 20050069284 | | 7/2005 | |
| KR | 20150032168 | | 3/2015 | |
| WO | WO-02073033 A1 | * | 9/2002 | F03G 7/065 |
| WO | WO-2013105387 A1 | * | 7/2013 | E05B 77/36 |
| WO | WO-2015150051 A1 | * | 10/2015 | A47L 15/4259 |
| WO | WO-2016185973 A1 | * | 11/2016 | E05B 47/0012 |

OTHER PUBLICATIONS

Office Action dated Jul. 10, 2019 for U.S. Appl. No. 16/020,187, IDFAUH18022 US-U II (pp. 1-6).

Office Action dated Dec. 2, 2019 for U.S. Appl. No. 16/020,187, IDFAUH18022 US-U II(pp. 1-5).

Office Action dated Nov. 12, 2019 for U.S. Appl. No. 16/020,194, IDFAUH18046 US-U II(pp. 1-6).

Office Action dated Jan. 10, 2020 for U.S. Appl. No. 16/020,201, IDFAUH18047 US-U I (75976279144) (pp. 1-8).

Office Action dated Jan. 16, 2020 for U.S. Appl. No. 16/020,201, IDFAUH18047 US-U I (75976279144) (pp. 1-8).

German Search Report for German Patent App No. 10 2021 107 652.8 dated Jan. 17, 2022, 8 pages, No English Translation Available.

Office Action dated May 1, 2020 for U.S. Appl. No. 16/020,194 (pp. 1-7).

Office Action (Non-Final Rejection) dated Jul. 14, 2022 for U.S. Appl. No. 16/425,239, (pp. 1-6).

* cited by examiner

ACTUATOR FOR A VEHICLE COMPARTMENT

BACKGROUND

The present disclosure relates to actuators for a compartment, and particularly to actuators adapted for use with vehicle components. More particularly, the present disclosure relates to actuators for use with storage box compartments.

SUMMARY

According to the present disclosure, a vehicle includes a storage compartment mounted to a frame of the vehicle. The storage compartment includes a glove box coupled to a vehicle in a fixed position relative to the vehicle and a latch system coupled to the glove box to allow a user access to the glove box. The glove box includes a container formed to include an aperture arranged to open into a space formed in the container and a lid coupled to the container to move relative to the container between a closed position and an open position.

In illustrative embodiments, the latch system includes a latch configured to change the lid from the closed position to the open position and an actuator coupled to the latch and configured to cause the latch to change the lid from the closed position to the open position in response to an input from a user. In illustrative embodiments, the actuator includes a printed circuit board coupled to the container, a transmission mover coupled to the printed circuit board to move relative to the printed circuit board and engaged with the latch to move the latch, and a control system coupled to the transmission mover and configured to apply power to the transmission mover to cause the transmission mover to change between positions along a lateral axis of the printed circuit board in response to receipt of the input to the control system.

In the illustrative embodiments, the transmission mover includes a lever coupled to the printed circuit board and arranged to extend toward the lock-unit transmission, a shape-memory alloy wire arranged to extend between and interconnect the printed circuit board and the lever. The shape-memory alloy wire is configured to pivot the lever about the pivot axis in response to changes in length of the shape-memory alloy wire upon receipt of power supplied from the control system.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
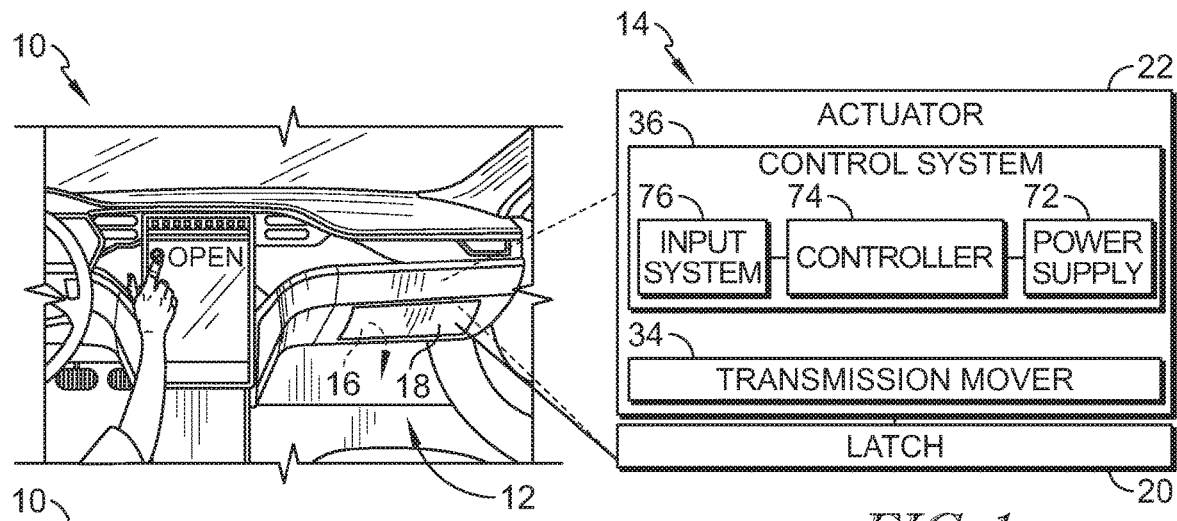
FIG. 1 is a perspective and diagrammatic view of a storage compartment in accordance with the present disclosure showing that the storage compartment includes a glove box and a latch system coupled to the glove box and to allow the glove box to change between a close position and an open position in response to an input provided by a control system.
Figure 2:
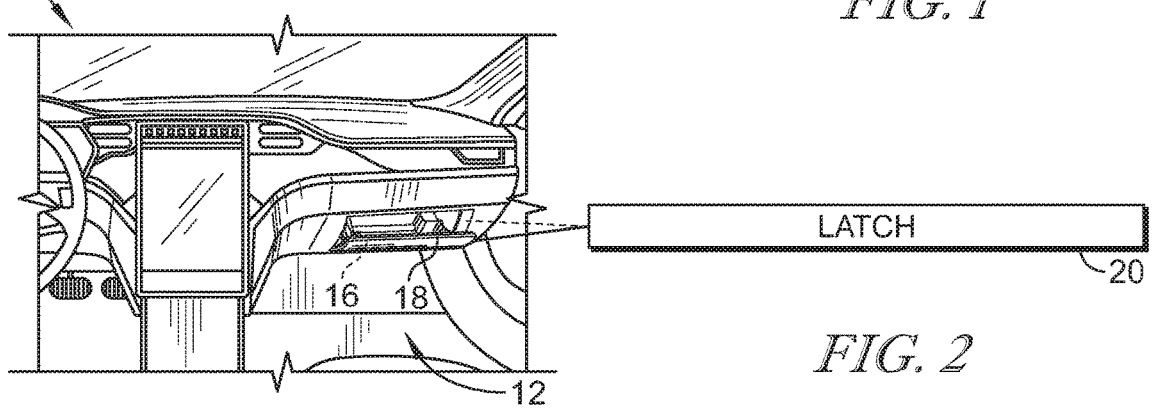
FIG. 2 is a view similar to FIG. 1 in which the latch system has been engaged to cause the glove box to move to the open position in response to receipt of the input provided by the user.
Figure 3:
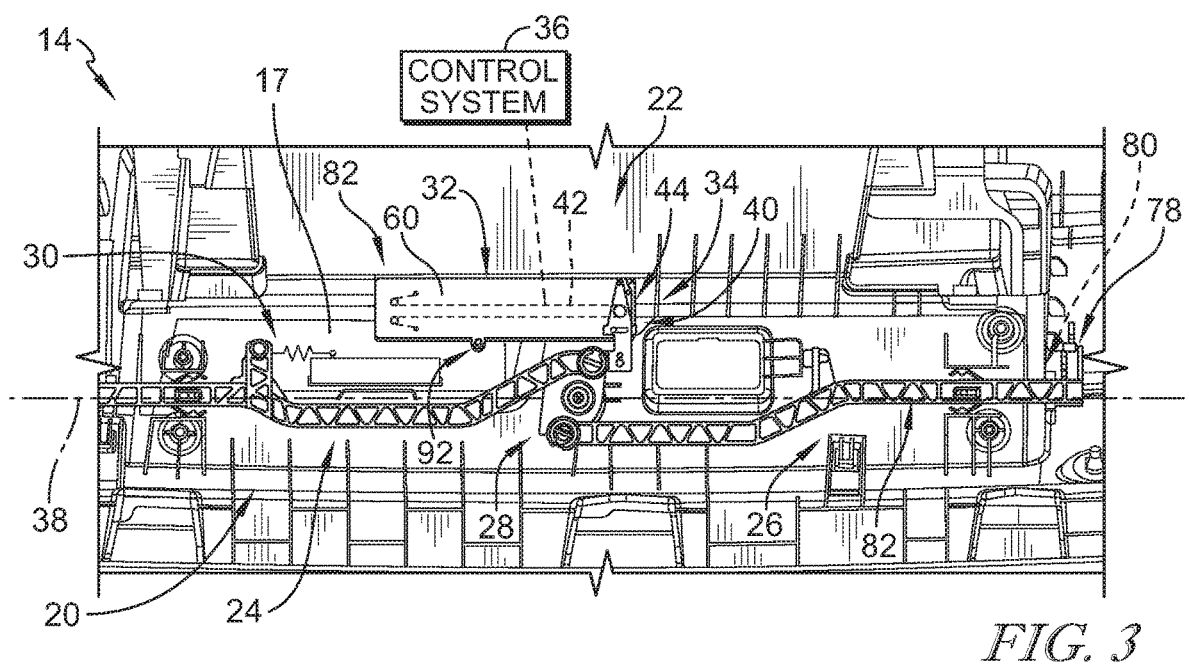
Figure 4:
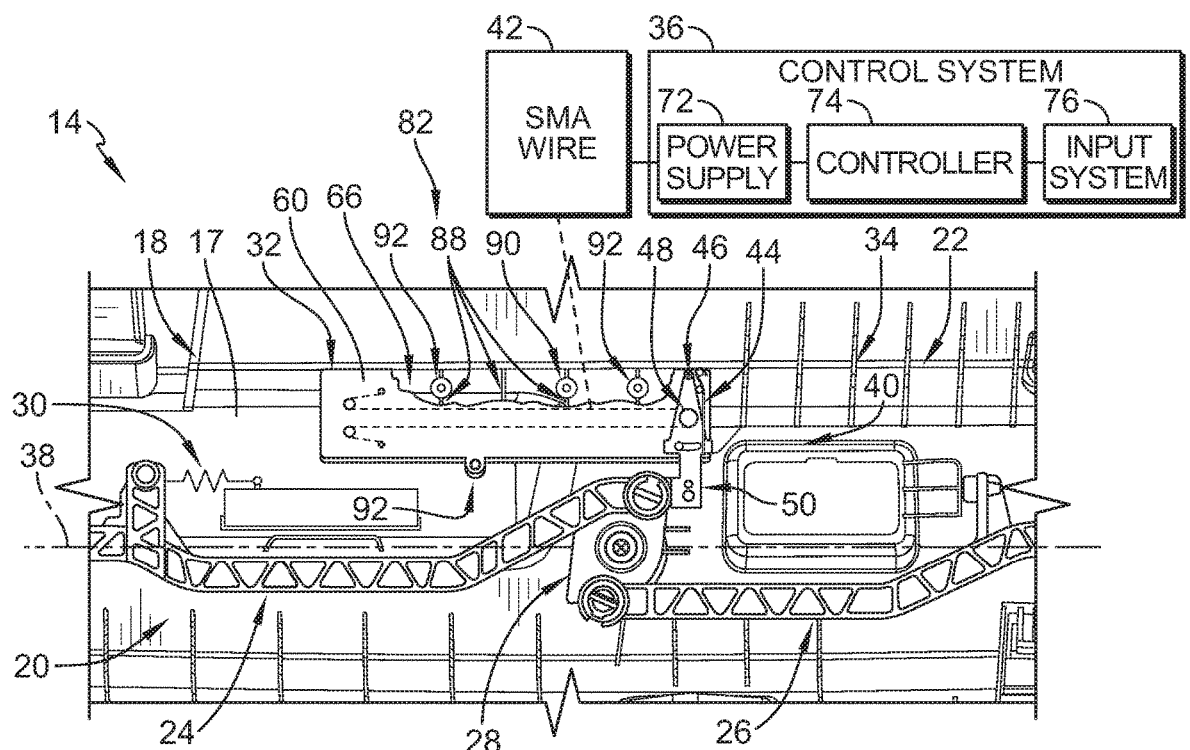
Figure 5:
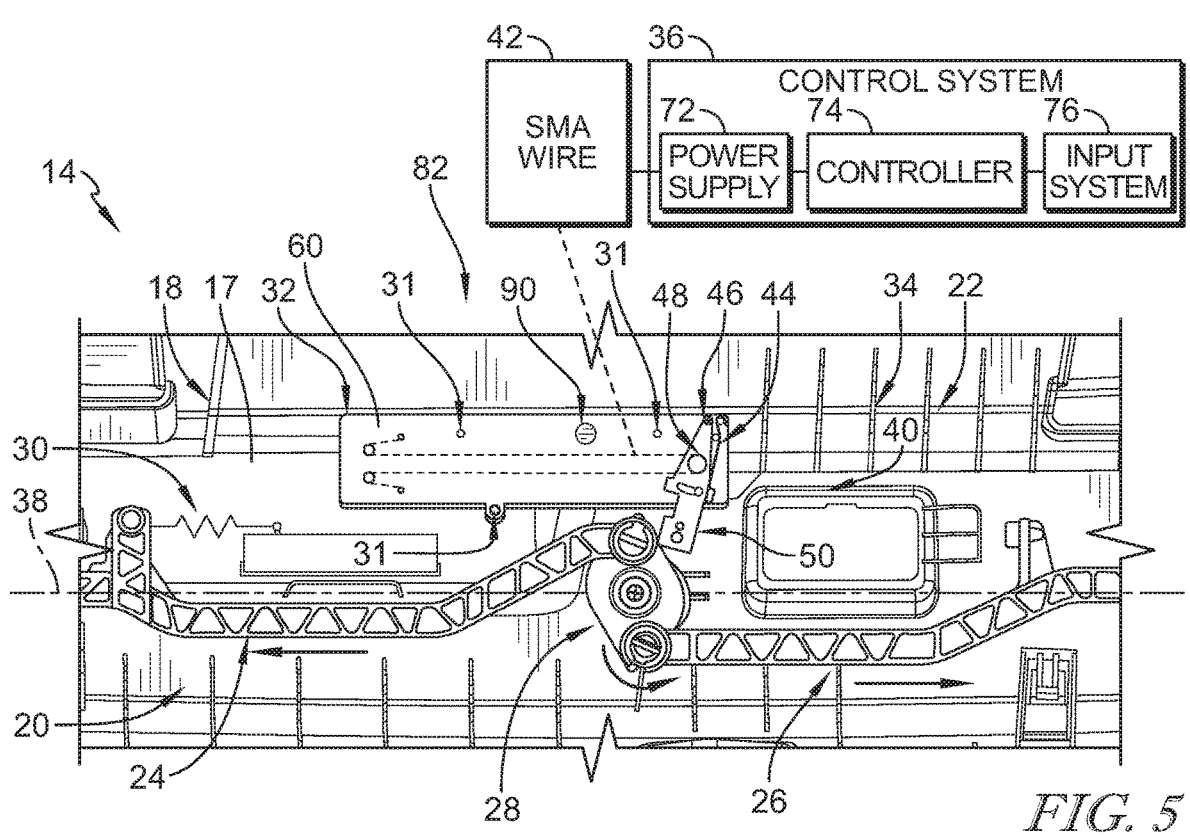
Figure 6:
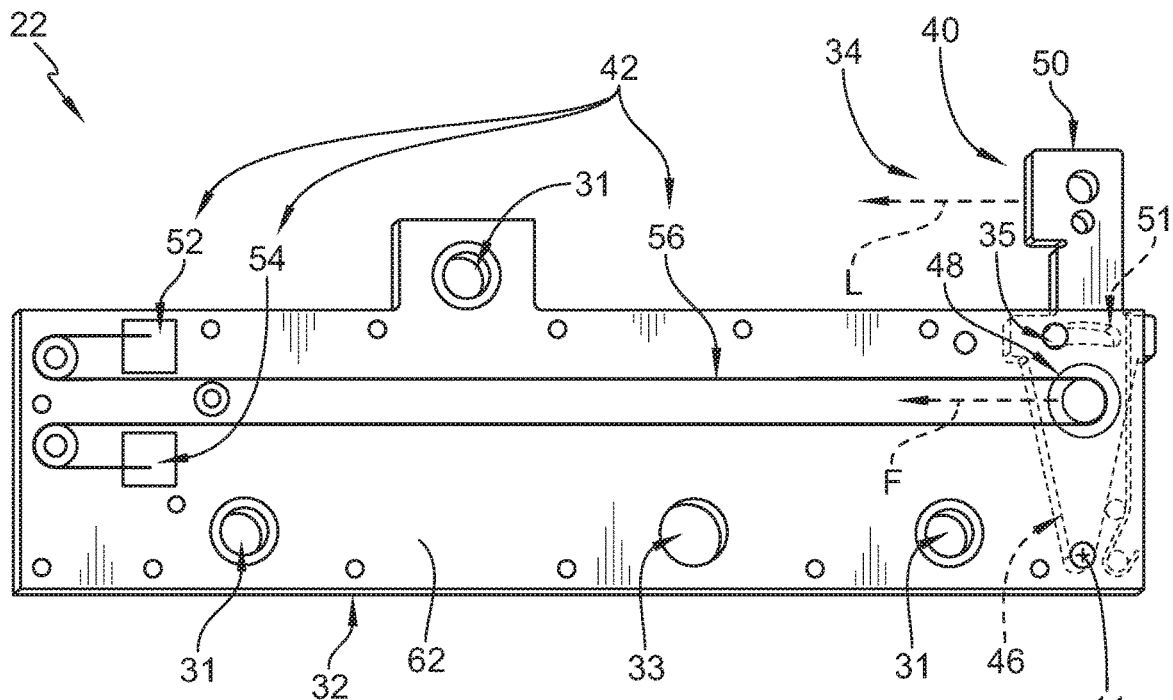
Figure 7:
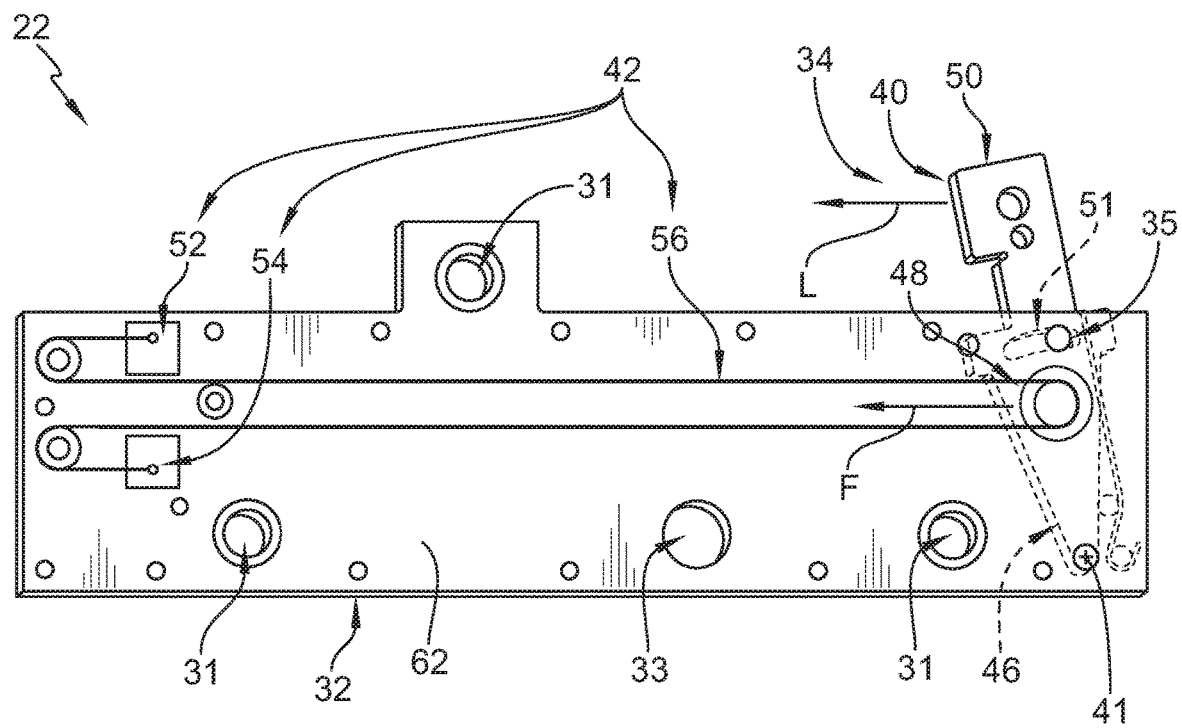
Figure 8:
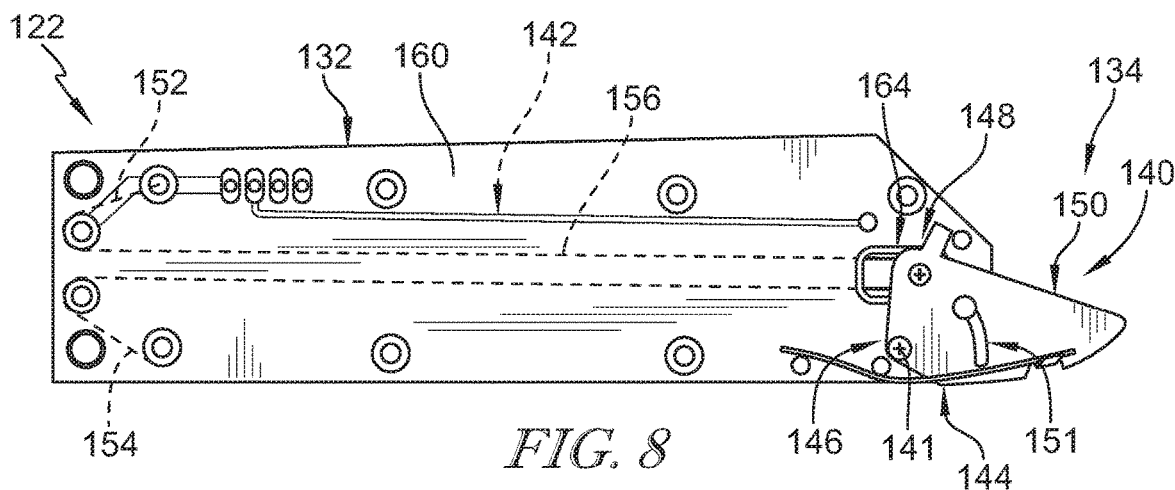
Figure 9:
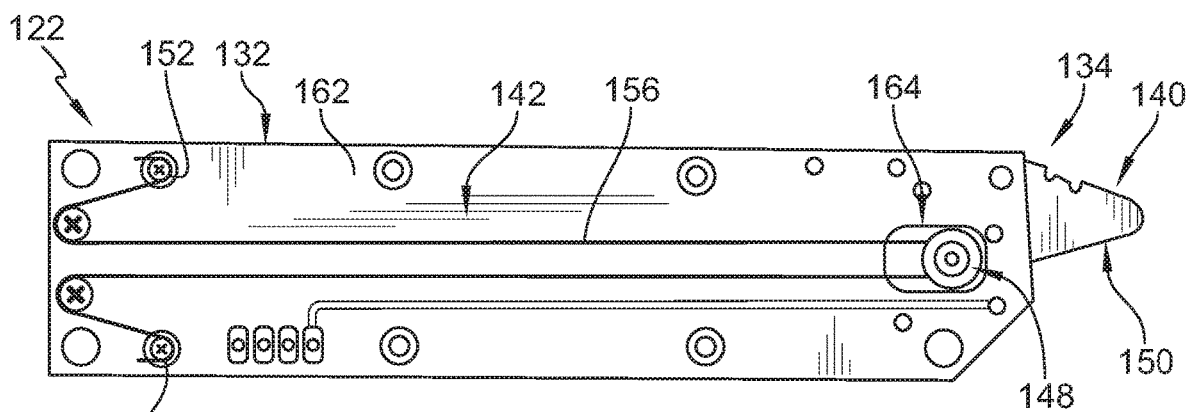
Figure 10:
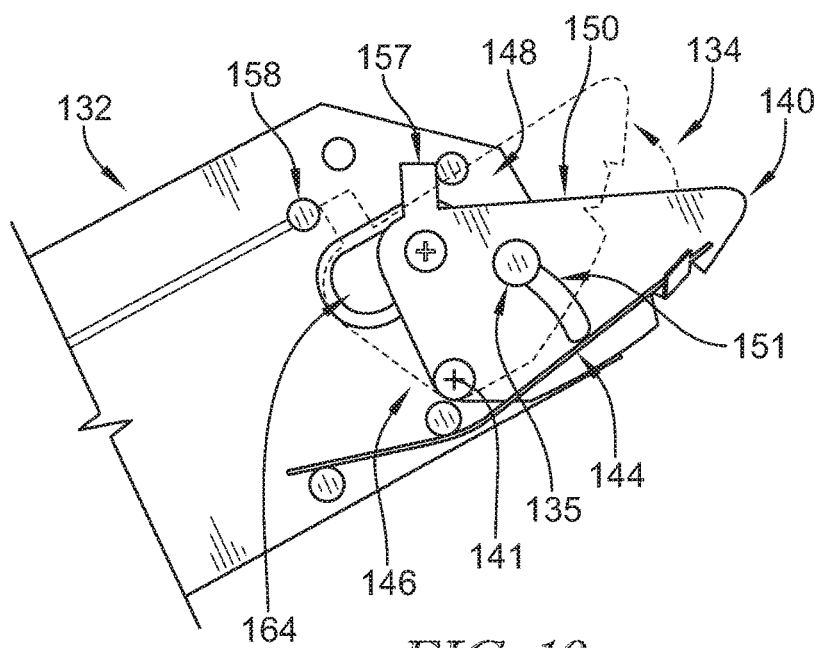

FIG. 3 is a partial plan view and diagrammatic view of the glove box in FIGS. 1 and 2 showing the latch system including a latch and an actuator coupled to the latch and configured to move the latch from a first position to a second position, the actuator including a printed circuit board mounted to the container in a fixed position and a transmission mover coupled to the printed circuit board to move relative to the printed circuit board and engaged with the latch to cause the latch to move between the first and second positions in response to the input from the user;

FIG. 4 is a partial plan view and diagrammatic view of the glove box showing the transmission mover includes a lever coupled to the printed circuit board and a shape-memory alloy wire that interconnects the printed circuit board and the lever and is configured to pivot the lever in response to changes in length of the shape-memory alloy wire between a first length and a relatively smaller second length as shown in FIG. 5;

FIG. 5 is a view similar to FIG. 4 showing the shape-memory alloy wire has changed from the first length to the second length causing the latch to move from the first position to the second position to cause the glove box to be in the open position;

FIG. 6 is a plan view of the transmission mover of FIG. 4 showing the lever includes a fulcrum portion coupled to the printed circuit board at the pivot axis, a load arm portion located in spaced apart relation to the fulcrum portion that engages the lock-unit transmission, and a lever arm located between the fulcrum portion and the load arm and coupled to the shape-memory alloy wire;

FIG. 7 is a view similar to FIG. 6 showing the shape-memory alloy wire has changed from the first length to the second length to apply an input force to the lever arm and cause the load arm to apply an output load to the latch;

FIG. 8 is a top and diagrammatic view of a second embodiment of an actuator to move the latch from the first positon to the second position, the actuator including a printed circuit board and a transmission mover having a lever coupled to the printed circuit board to move relative to the printed circuit board and engaged with the latch to cause the latch to move between the first and second positions in response to the input from the user and an actuator spring arranged to extend between the printed circuit board and the lever;

FIG. 9 is a bottom view of the actuator of FIG. 9 showing the transmission mover further includes a shape-memory alloy wire arranged to extend between and interconnect the printed circuit board and the lever and configured to pivot the lever in response to changes in length of the shape-memory alloy wire between the first length and the relatively smaller second length; and FIG. 10 is a partial perspective view of the actuator of FIG. 9 showing the lever includes a fulcrum portion coupled to the printed circuit board at a pivot axis, a load arm located in spaced apart relation to the fulcrum portion that engages the lock-unit transmission, and a lever arm located between the fulcrum portion and the load arm to form a triangular shape and coupled to the shape-memory alloy wire to pivot the lever about the pivot axis.

DETAILED DESCRIPTION

A first embodiment of a storage compartment 10 is shown in FIGS. 1-7. The storage compartment 10, also referred to as the glove compartment 10, includes a glove box 12 and a latch system 14 configured to receive inputs from a user to cause the glove box 12 to change between a closed position shown in FIGS. 1 and 5 and an open position shown in FIGS. 2 and 6. A second embodiment of a storage compartment 110 is shown in FIGS. 8-10.

A glove compartment 10 includes a storage box 12, also called a glove box 12, and a latch system 14 as shown in FIGS. 1-3. The glove box 12 is adapted to be coupled to a vehicle in a fixed position relative to the vehicle. The latch system 14 is coupled to the glove box 12 and is configured to allow a user access to the glove box 12.

The glove box 12 includes a container 16 and a lid 18 as shown in FIGS. 1 and 2. The container 16 is formed to include an aperture arranged to open into a space formed in the container 16. The lid 18 is coupled to the container 16 and moves relative to the container 16 between a closed position as shown in FIGS. 1 and 5 and an open position as shown in FIGS. 2 and 6.

The latch system 14 includes a latch 20 and an actuator 22 as shown in FIGS. 4-6. The latch 20 is configured to allow the lid 18 to move between the closed position and the open position. The lid 18 is in the closed position when the lid 18 closes the aperture and blocks access to the space. The lid is in the open position when the lid 18 has moved away from the container 16 to allow access to the space through the aperture. The actuator 22 is engaged with the latch 20 and is configured to cause the latch to move the latch 20.

The latch 20 includes first and second lock-units 24, 26, a lock-unit transmission 28, and a latch spring 30 as shown in FIGS. 5 and 6. The first lock-unit 24 unit is coupled to the container 16 to move relative to the container 16. The second lock-unit 26 unit is coupled to the container 16 to move relative to the container 16. The lock-unit transmission 28 is arranged to extend between and interconnect the first lock-unit 24 and the second lock-unit 26 to cause movement of the first lock-unit 24 to be transmitted to the second lock-unit 26. The first lock-unit 24 and the second lock-unit 26 move away from one another when the latch 20 is in the unlocked configuration and move toward one another when the latch 20 is in the locked configuration. The latch spring 30 is arranged to extend between and interconnect the container 16 and the latch 20.

The first and second lock-units 24, 26 are moveable between a first position in which movement of the lid 18 relative to the container 16 is blocked when the lid 18 is in the closed position and a second position in which movement of the lid 18 away from the container 16 is permitted. The latch spring 30 is configured to provide a latch bias force to the latch 20 to urge the latch 20 in the second direction to cause the latch 20 to move toward the first position.

The actuator 22 includes a printed circuit board 32, a transmission mover 34, and control system 36 as shown in FIGS. 3-6. The printed circuit board 32 is coupled to the container 16. The transmission mover 34 is coupled to the printed circuit board 32 to move relative to the printed circuit board 32 and is engaged with the lock-unit transmission 28 to cause the lock-unit transmission 28 to move between the first position and the second position. The control system 36 is coupled to the transmission mover 34 and is configured to apply power to the transmission mover 34 to cause the transmission mover 34 to change between a first mover position as shown in FIG. 5 and a second mover position as shown in FIG. 6 along a lateral axis 38 of the printed circuit board 32 in response to receipt of the input to the control system 36.

The transmission mover 34 includes a lever 40, a shape-memory alloy wire 42, and an actuator spring 44 as shown in FIGS. 3-6. The lever 40 is coupled to the printed circuit board 32 and arranged to extend toward the lock-unit transmission 28 to engage the lock-unit transmission 28. The lever 40 is configured to pivot relative to the printed circuit board 32 about a pivot axis 41 that is perpendicular to the lateral axis 38. The shape-memory alloy wire 42 is coupled to the lever 40 and configured to pivot the lever 40 about the pivot axis 41 in response to changes in length of the shape-memory alloy wire 42 between a first length as shown in FIG. 6 and a relatively smaller second length as shown in FIG. 7. The actuator spring 44 is arranged to extend between and interconnect the printed circuit board 32 to the lever 40.

The first length of the wire 42 is associated with the first mover position. The second length of the wire 42 is associated with the second mover position. The shape-memory alloy wire 42 changes between the first and second lengths in response to the receipt of power supplied from the control system 36.

The lever 40 moves in a first direction about the pivot axis 41 from the first mover position to the second mover position when the shape-memory alloy wire 42 changes from the first length to the second length. The actuator spring 44 is configured to provide an actuator bias force to the lever 40 to urge the lever 40 in a second direction opposite the first direction to cause the transmission mover 34 to move toward the first mover position. In the illustrative embodiment, the actuator bias force is about 4.5 Newtons.

The lever 40 includes a fulcrum portion 46, a load arm 48, and a lever arm 50 as shown in FIGS. 4-7. The fulcrum portion 46 is coupled to the printed circuit board 32 at the pivot axis 41. The load arm 48 is located in spaced apart relation to the fulcrum portion 46 and engaged with the lock-unit transmission 28 to provide an output load, indicated by arrow L, to the lock-unit transmission 28 to change the lock-unit transmission 28 from the first position and the second position. The lever arm 50 is located between the fulcrum portion 46 and the load arm 48 and coupled to the shape-memory alloy wire 42 to receive an input force, indicated by arrow F, applied by the shape-memory alloy wire 42 in response to the shape-memory alloy wire 42 changing from the first length to the relatively shorter second length.

The needed output load L applied by the lever 40 needs to be greater than the force used to close the glove box 12. The force used to open the glove box 12 includes the actuator bias force of about 4.5 Newtons and the opening force of the glove box, which may be in a range of between 12 Newtons to 20 Newtons.

The retraction, or input force F, of the shape-memory alloy wire 42 is dependent upon the overall or the first length of the wire 42, i.e. the greater the length the more the wire retracts. The shape-memory alloy wire 42 retracts three percent of the total wire length. Therefore, the greater the length of the wire 42, the greater the capable input force F of the wire 42.

The thickness of the wire 42 may also be increased to achieve the desired force/retraction needed to open the glove box 12. The thicker the wire 42 the greater the strength. However, more wire means a larger increase in temperature of the wire 42, and cooling time of the wire 42 increases, which could damage the actuator 22. Further, the longer and thicker the wire 42, more space will be needed to fit the actuator 22 in the glove box 12.

As such, the transmission mover 34 includes the lever 40 to multiply the force/retraction of the shape-memory alloy wire 42. By using the shape-memory alloy wire 42 to pivot the lever 40, the input force F applied by the wire 42 may be multiplied to achieve the desired output load L, while minimizing the amount of wire 42 to manage temperature and space within the glove box 12. The output load L applied by the load arm 48 of the lever 40 to the lock-unit transmission 28 is greater than the input force F applied by the shape-memory alloy wire 42 to the lever arm 50 of the lever 40.

A method of using the latch system 14 includes several steps. The method begins with the latch 20 in the first position as shown in FIG. 4 and the lid 18 in the closed position. A user desiring to change the lid 18 from the closed position to the open position continues the method by providing an input to the control system 36, which causes the an amount of power to flow to the shape-memory alloy wire 42 and causes the shape-memory alloy wire 42 to retract from the first length as shown in FIGS. 4 and 6 to the second length as shown in FIGS. 5 and 7.

Once power is supplied from the control system 36 to the shape-memory alloy wire 42, the shape-memory alloy wire 42 changes from the first length to the second length to apply the input force F to the lever arm 50. In turn, the input force F to the lever arm 50 pivots the lever 40 about the axis 41 so that the load arm 48 applies the output load L to the lock-unit transmission 28 to change the dual lock-units 24, 26 from the first position to the second position. As a result, the lid 18 of the glove box 12 changes from the closed position to the open position.

The output load F causes the lever 40 to rotate in a first direction about the pivot axis 41 and apply the output load L to the lock-unit transmission 28 of the latch 20. The output load L applied by the load arm 48 of the lever 40 causes the latch 20 to change from the first position to the section position to allow the lid 18 to change from the closed position to the open position.

The method continues after the lid 18 of the glove box 12 opens. The instant the lid 18 of the glove box 12 opens, the control system 36 is configured to stop supplying power to the wire 42 and the shape-memory alloy wire 42 begins to cool and return to the original first length. The actuator spring 44 extends between the printed circuit board 32 and the load arm 48 to support the return of the shape-memory alloys wire 42 from the second length to the first length. As such, the shape-memory alloy wire 42 is also configured to withstand such repeated opening and closing of the lid 18 of the glove box 12.

In some embodiments, the control system 36 is configured to apply power to the shape-memory alloy wire 42 for a predetermined amount of time to cause the wire 42 to change from the first length to the second length and open the lid 18 of the glove box 12. In other embodiments, a portion of the lever 40 is configured to contact a portion of the printed circuit board 32 when the lever 40 is in the second mover position or at the end of the stroke of the lever 40. Once the portion of the lever 40 engages the portion of the circuit board 32, indicating the lid 18 has been moved to the open position, the control system 36 receives an input/signal that directs the control system 36 to direct to stop providing the predetermined amount of power to the shape-memory alloy wire 42. In this way, the shape-memory alloy wire 42 is not overheated.

In the illustrative embodiment, the lever 40 further includes a guide notch 51 as shown in FIGS. 6 and 7. The guide notch 51 is shaped to receive a guide pin 35 included in the printed circuit board 32. The guide pin 35 moves in the guide notch 51 as the lever 40 rotates about the pivot axis 41. The guide notch 51 is sized to allow the lever 40 to rotate to the full stroke, but also block further rotation of the lever 40.

In the illustrative embodiment, the shape of the wire 42 includes a first end 52, a second end 54, and a middle section 56 as shown in FIGS. 6 and 7. The first end 52 is coupled to the printed circuit board 32, while the second end 54 coupled to the printed circuit board 32 in spaced apart relation to the first end 52. The middle section 56 is arranged to extend between the first end 52 and the second end 54. In the illustrative embodiment, the middle section 56 is coupled to the lever arm 50 to pivot the lever 40.

In the illustrative embodiment, the printed circuit board 32 has a first side 60 and a second side 62 as shown in FIGS. 4-7. The second side 62 is opposite the first side 60 and faces the container 16 to form an interior space 66 that houses the shape-memory alloy wire 42. The fulcrum portion 46 of the lever 40 is coupled to the first side 60 of the printed circuit board 32, while the shape-memory alloy wire 42 is coupled to the second side 62 of the printed circuit board 32. The lever arm 50 extends through an aperture (not shown) formed in the printed circuit board 32 and is coupled to the shape-memory alloy wire 42. In this way, the shape-memory alloy wire 42 is not exposed to the surrounding environment.

The control system 36 includes a power supply 72, a controller 74, and an input system 76 as shown in FIGS. 1 and 2. The power supply 72 is coupled to the shape-memory alloy wire 42 through the printed circuit board 32. The power supply 72 is configured to provide a predetermined amount of power/current to the shape-memory alloy wire 42 to change the shape-memory alloy wire 42 from the first length to the second length. The controller 74 is coupled to the power supply 72 and the input system 76 and is configured to provide direct the power supply 72 to supply power to the shape-memory alloy wire 42 in response to the input being provided from the user.

In the illustrative embodiments, the power supply 72 supplies a current of about 410 milliamps to the wire 42 to heat the wire 42. The wire 42 retracts about 3 percent to about 5 percent of the first length, about 10 millimeters. In the illustrative embodiment, the first length is about 217 millimeters.

The input from the user causes the controller 74 to provide power/current from the power supply 72 to the wire 42. The wire 42 changes from the first length to the relatively smaller second length in milliseconds. Once the portion of the lever 40 engages the end stop 58, indicating the lid 18 has been moved to the open position; the controller 74 receives an input/signal that directs the controller 74 to direct the power supply 72 to stop providing the predetermined amount of power to the shape-memory alloy wire 42. In this way, the shape-memory alloy wire 42 is not overheated by the power supply 72.

In one example, the input system 76 may include a button coupled to the control system 36 and is configured to provide the input in response to engagement of the button. In another example, the input system 76 may also include a touch screen coupled to the control system 36 and configured to provide the input in response to engagement of the touch screen. The input system may further include a remote device. The remote device is coupled to the control system 36 and is configured to provide the input in response to engagement of the remote device.

In the illustrative embodiment, the first lock-unit 24 and second lock-unit 26 each include a lock tab 78, a lock-tab receiver 80, and a tab-mover arm 82 as shown in FIG. 3. The lock tab 78 is movable between a first lock-tab position as shown in FIG. 6 and a second lock-tab position as shown in FIG. 7. The lock tab 78 is in the first lock-tab position when movement of the lid 18 relative to the container 16 is blocked. The lock tab 78 is in the second lock-tab position when movement of the lid 18 away from the container 16 is permitted. The lock-tab receiver 80 is configured to receive the lock tab 78 therein when the lock tab 78 is in the first lock-tab position and the lid 18 is in the closed position. The tab-mover arm 82 is coupled to the lock tab 78 to move therewith.

In the illustrative embodiment, the latch 20 includes two lock-units 24, 26 as shown in FIG. 2. In other embodiments, the latch 20 may include a single lock-unit 24, 26. The single lock-unit 24, 26 may be coupled to the container 16 to move relative to the container 16 along the lateral axis 38 between the first and second positions. In the illustrative embodiment, the latch spring 30 is arranged to extend between and interconnect the container 16 and the first lock-unit 24. In other embodiments, the latch spring 30 may be arranged to extend between and interconnect the container 16 to the second lock-unit 26.

In the illustrative embodiment, the actuator 22 is engaged with the lock-unit transmission 28 and is configured to cause the lock-unit transmission 28 to move the first and second lock-units 24, 26 between the first and second positions in response to the input. In other embodiments the actuator 22 may be engaged with one of the first or second lock-units 24, 26 to move the latch 20 between the first and second positions. In other embodiments, the actuator 22 may engage the lock tabs 78 to change the lock tabs 78 between the first lock-tab position and the second lock-tab position.

In the illustrative embodiment, wherein the first lock-unit 24 and the second lock-unit 26 move in a third direction along the lateral axis from the first position to the second position as shown in FIGS. 3 and 4. When the shape-memory alloy wire 42 changes from the first length to the second length, the lock tabs 78 move in the third direction from the first lock-tab position to the second lock-tab position, so that the lid 18 can move to the open position.

In the illustrative embodiments, the container 16 is shaped to include a mount 86 as shown in FIGS. 4 and 5. The mount 86 supports the transmission mover 34 relative to the container 16. The mount 86 is configured to locate the transmission mover 34 at a correction location relative to the lock-unit transmission 28 so that the lever 40 engages the lock-unit transmission 28.

The mount 86 includes a plurality of support ribs 88, locating pin 90, and a plurality of fastener mounts 92 as suggested in FIGS. 4 and 5. The support ribs 88 extend outward from an interior surface 17 of the container 16 to position the transmission mover 34 at the same height relative to the latch 20 so that the lever 40 correctly engages the lock-unit transmission 28. The locating pin 90 extends through the a locator hole 33 formed in the printed circuit board 32 to block movement of the printed circuit board relative to the container 16 and the latch 20. The locating pin 90 also ensures alignment of the fastener mounts 92 with the corresponding holes 31 formed in the printed circuit board 32 so that fasteners may be used to couple the printed circuit board 32 to the mount 86.

In another example, the latch system 14 includes the latch 20 and an actuator 122 as shown in FIGS. 7-9. The latch 20 is coupled to the lid 18 and is configured to change the lid 18 from the closed position to the open position. The actuator 122 is coupled to the latch 20 and is configured to cause the latch 20 to change the lid 18 from the closed position to the open position in response to an input from a user.

The actuator 122 includes a printed circuit board 132, a transmission mover 134, and a control system 36 as shown in FIGS. 7-9. The printed circuit board 132 is coupled to the container 16. The transmission mover 134 is coupled to the printed circuit board 132 and is engaged with the latch 20 to cause the latch 20 to move between the locked and unlocked configurations. The control system 36 is coupled to the transmission mover 134 and is configured to apply power to the transmission mover 134 to cause the transmission mover 134 to change the latch 20 between the locked and unlocked configurations along the lateral axis 38 of the printed circuit board 132 in response to receipt of the input to the control system 36.

The transmission mover 134 includes a lever 140, a shape-memory alloy wire 142, and an actuator spring 144 as shown in FIGS. 8-10. The lever 140 is coupled to the printed circuit board 132 and arranged to extend toward the lock-unit transmission 128 to engage the lock-unit transmission 128. The lever 140 is configured to pivot relative to the printed circuit board 132 about a pivot axis 141 that is perpendicular to the lateral axis 38. The shape-memory alloy wire 142 is coupled to the lever 140 and configured to pivot the lever 140 about the pivot axis 141 in response to changes in length of the shape-memory alloy wire 142 between the first length and the relatively smaller second length. The actuator spring 144 is arranged to extend between and interconnect the printed circuit board 132 to the lever 140.

In the illustrative embodiment, the lever 140 moves in a first direction about the pivot axis 141 from the first mover position to the second mover position when the shape-memory alloy wire 142 changes from the first length to the second length. The actuator spring 144 is configured to provide an actuator bias force to the lever 140 to urge the lever 140 in a second direction opposite the first direction to cause the transmission mover 134 to move toward the first mover position.

The lever 140 includes a fulcrum portion 146, a load arm 148, and a lever arm 150 as shown in FIGS. 8-10. The fulcrum portion 146 is coupled to the printed circuit board 132 at the pivot axis 141. The load arm 148 is located in spaced apart relation to the fulcrum portion 146 and engaged with the lock-unit transmission 128 to provide an output load L to the lock-unit transmission 128 to change the lock-unit transmission 128 from the first position and the second position. The lever arm 150 is located between the fulcrum portion 146 and the load arm 148 and coupled to the shape-memory alloy wire 142 to receive the input force F applied by the shape-memory alloy wire 142 in response to the shape-memory alloy wire 142 changing from the first length to the relatively shorter second length.

In the illustrative embodiment, the lever 40 has a triangular shape as shown in FIGS. 8-10. The load arm 148 extends toward and engages the lock-unit transmission 28 parallel with In the illustrative embodiment, the shape of the wire 142 includes a first end 152, a second end 154, and a middle section 156 as shown in FIGS. 6 and 7. The first end 152 is coupled to the printed circuit board 132, while the second end 154 coupled to the printed circuit board 132 in spaced apart relation to the first end 152. The middle section 156 is arranged to extend between the first end 152 and the second end 154. In the illustrative embodiment, the middle section 156 is coupled to the lever arm 150 to pivot the lever 140.

The first end 152 of the shape-memory alloy wire 142 is coupled to an electromechanical end stop 158 of the printed circuit board 132. A portion 157 of the lever 140 is configured to contact the end stop 158 when the lever 140 is in the second mover position or at the end of the stroke of the lever 140 as suggested in FIG. 10.

Another method for using the actuator 122 in the latch system 14 includes several steps. The method begins with the latch 20 in the first position as shown in FIG. 4 and the lid 18 in the closed position. A user desiring to change the lid 18 from the closed position to the open position continues the method by providing an input to the control system 36, which causes the an amount of power to flow to the shape-memory alloy wire 142 and causes the shape-memory alloy wire 142 to retract from the first length to the second length.

Once power is supplied from the control system 36 to the shape-memory alloy wire 142, the shape-memory alloy wire 142 changes from the first length to the second length to apply the input force F to the lever arm 150. In turn, the input force F to the lever arm 150 pivots the lever 140 about the axis 141 so that the load arm 148 applies the output load L to the lock-unit transmission 28 to change the dual lock-units 24, 26 from the first position to the second position. As a result, the lid 18 of the glove box 12 changes from the closed position to the open position.

The output load F causes the lever 140 to rotate in a first direction about the pivot axis 41 and apply the output load L to the lock-unit transmission 28 of the latch 20. The output load L applied by the load arm 148 of the lever 140 causes the latch 20 to change from the first position to the section position to allow the lid 18 to change from the closed position to the open position The method continues with the portion 157 of the lever 40 contacting the electromechanical end stop 158 once the lever 40 reaches the full stroke. Once the portion 157 of the lever 140 engages the end stop 158, indicating the lid 18 has been moved to the open position; the controller 74 receives an input/signal that directs the controller 74 to direct the power supply 72 to stop providing the predetermined amount of power to the shape-memory alloy wire 142. In this way, the shape-memory alloy wire 42 is not overheated by the power supply 72.

The instant the portion 157 of the lever 140 engages the end stop 158, the control system 36 is configured to stop supplying power to the wire 142 and the shape-memory alloy wire 142 begins to cool and return to the original first length. The actuator spring 144 extends between the printed circuit board 132 and the load arm 148 to support the return of the shape-memory alloys wire 142 from the second length to the first length. As such, the shape-memory alloy wire 142 is also configured to withstand such repeated opening and closing of the lid 18 of the glove box 12.

In the illustrative embodiment, the printed circuit board 132 has a first side 160 and a second side 162 as shown in FIGS. 8-10. The second side 162 is opposite the first side 60 and faces the container 16. The fulcrum portion 146 of the lever 140 is coupled to the first side 160 of the printed circuit board 132, while the shape-memory alloy wire 142 is coupled to the second side 162 of the printed circuit board 132. The lever arm 150 extends through an aperture 164 formed in the printed circuit board 132 and is coupled to the shape-memory alloy wire 142. In this way, the shape-memory alloy wire 142 is not exposed to the surrounding environment.

An actuator in accordance with the present disclosure may be used as part of a compartment. The compartment, in one example, may be in a vehicle. The compartment includes a box and a latch. The box includes include a container and a lid. The latch is configured to selectively limit access to the container by blocking movement of the lid. In one example, the container is an engine bay and the lid is a hood of the vehicle. In another example, the container is a trunk and the lid is a trunk lid. In another example, the container is a passenger cabin and the lid is a door of the vehicle.

Such compartments may be opened electronically with actuator instead of manual operation. In some embodiments, solenoid actuators may be used to electronically open the compartment. However, solenoid actuators are expensive, loud, and hard to package. Shape-memory alloy wire technology provides a cost-effective solution that also improves packaging and noise.

Shape-memory alloy wire contracts when current is applied. The force and stroke of contraction may be harnessed to provide useful work as an actuator. In the illustrative embodiment, the shape-memory alloy wire 42 causes the output-stage lever 40 to rotate the central cam or lock-unit transmission 28 of the glove box latch mechanism 20 to open the glove box 12 electronically. When current stops, the shape-memory alloy wire 42 cools and retracts to its original position, allowing the glove box 12 to be closed manually.

The actuator 22 applies a force F as shown in FIG. 7, causing the lock-unit transmission 28 to rotate. As the lock-unit transmission 28 rotates, the arms 82 of the lock-units 24, 26 move laterally outwards along the lateral axis 38. The lateral movement of the arms 82 causes the lock tab 78 to move out of the lock-tab receiver 80, allowing the lid 18 to open.

The return spring 30 pulls the latch 20 back to its original position after the lid 18 drops down. Closing the glove box 12 causes the arms 82 to momentarily move in the directions shown until the lock tabs 78 line up with the lock-tab receivers 80 in the container 16. The return spring 30 forces the lock tabs 78 into the lock-tab receivers 80 and the glove box 12 is closed.

In the illustrative embodiment, the actuator 22 includes a printed circuit board (PCB) 32 as the base structure of the actuator 22. Integrated wires and connectors allow current to flow throw circuit to a single shape-memory alloy wire 42, which is fastened to the board 32.

The wire 42 contracts approximately 3-5% of wire length. This contracting wire 42 exerts force F on the lever arm 50, which rotates load arm 48 to provide output load L at the load arm. A bias spring 44 aids in the retraction of the wire 42 after voltage is turned off.

In the illustrative embodiment, the actuator 22 is activated with a voltage of about 3-15V (higher voltages decrease actuation time). With desired voltage (Vcc) and ground leads connected, a logic-level signal is sent to a transistor driver circuit of the actuator 22. The driver applies the desired voltage (Vcc) to the shape-memory alloy wire 42. The signal can also be PWM to simulate a voltage lower than Vcc.

Particularly when high voltage is applied, shape-memory alloy wires have potential to heat up very quickly and burn out, rendering the wires unusable. To minimize the risk of this, the actuator 122 may include electromechanical end stop 158. When the lever 40 reaches the predetermined end of its stroke, the portion of the lever 40 will contact the end stop 158. This signals to the control electronics to stop the voltage and the spring 44 returns the wire 42 to the first length. These steps may be repeated to reopen the glove box 12 and the on-and-off modulation prevents the wires from overheating.

In the illustrative embodiment, the shape-memory alloy wire 42 contracts a few millimeters. The lever 40 multiplies the stroke by to achieve the needed output stroke and load to change the lock-unit transmission 28 from the first position to the second position. The lever 40 multiplies the stroke of the wire 42 to achieve an output stroke of 8 mm (2.6 times the stroke of the wire 42). The output load L at the end of the load arm 48 is approximately 25 N. After contraction, the shape-memory alloy wire 42 retracts to its original position within 5 seconds, aided by the bias spring 44.

In the illustrative embodiment, the actuator 22 is coupled to the mount 86 formed in the container 16. The mount 86 provides fastening for the actuator 22 to glove box 12 through three screw holes 31. The locating pin 90 provides physical reference for easy assembly. The support ribs 88 provide further support for actuator 22.

The lever 40 of the actuator 22 is positioned to touch the lock-unit transmission 28. The interface of the lever 40 and the latch 20 is decoupled. The force F applied by the shape-memory alloy wire 42 of the actuator 22 when contracting causes the latch 20 to move and open the glove box 12.

However, retraction/extension of the shape-memory alloy wire 42 does not affect the return of the latch 20 to the first position, allowing the return spring 44 to bias the shape-memory alloy wire 42 wire to return to the first length at a different rate.

Furthermore, the temporary movement of the latch 20 during closing of the lid 18 does not affect the actuator 22. In the illustrative embodiment, the actuator 22 provides significant cost reduction, smaller packaging, and noise reduction (silent actuation) compared to typically electronic glove box actuators.

The following numbered clauses include embodiments that are contemplated and non-limiting:

Clause 1. A storage compartment comprising a storage box adapted to be coupled to a vehicle in a fixed position relative to the vehicle, the storage box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture.

Clause 2. The storage compartment of clause 1, any other clause, or any combination of clauses, further comprising a latch including first lock-unit coupled to the container to move relative to the container and a lock-unit transmission coupled to the first lock-unit.

Clause 3. The storage compartment of clause 2, any other clause, or any combination of clauses, wherein the first lock-unit is moveable between a first position in which movement of the lid relative to the container is blocked when the lid is in the closed position and a second position in which movement of the lid away from the container is permitted.

Clause 4. The storage compartment of clause 3, any other clause, or any combination of clauses, further comprising an actuator engaged with the lock-unit transmission and configured to cause the lock-unit transmission to move the first lock-unit between the first position and the second position in response to an input.

Clause 5. The storage compartment of clause 4, any other clause, or any combination of clauses, wherein the actuator includes a printed circuit board, a transmission mover coupled to the printed circuit board to move relative to the printed circuit board and engaged with the lock-unit transmission to cause the lock-unit transmission to move between the first position and the second position, and a control system coupled to the transmission mover and configured to apply power to the transmission mover to cause the transmission mover to change between a first mover position associated with the first position of the first lock-unit and a second mover position associated with the second position of the first lock-unit along a lateral axis of the latch in response to receipt of the input to the control system.

Clause 6. The storage compartment of clause 5, any other clause, or any combination of clauses, wherein the transmission mover includes a lever coupled to the printed circuit board and arranged to extend toward the lock-unit transmission to engage the lock-unit transmission, the lever configured to pivot relative to the printed circuit board about a pivot axis that is perpendicular to the lateral axis.

Clause 7. The storage compartment of clause 6, any other clause, or any combination of clauses, wherein the transmission mover further includes a shape-memory alloy wire arranged to extend between and interconnect the printed circuit board and the lever and configured to pivot the lever about the pivot axis in response to changes in length of the shape-memory alloy wire between a first length associated with the first mover position and a relatively smaller second length associated with the second mover position in response to the receipt of power supplied from the control system.

Clause 8. The storage compartment of clause 7, any other clause, or any combination of clauses, wherein the lever pivots in a first direction about the pivot axis from the first mover position to the second mover position when the shape-memory alloy wire changes from the first length to the relatively smaller second length.

Clause 9. The storage compartment of clause 8, any other clause, or any combination of clauses, wherein the transmission mover further includes an actuator spring arranged to extend between and interconnect the printed circuit board and the lever and configured to provide a first bias force to the lever to urge the lever in a second direction opposite the first direction to cause the transmission mover to move toward the first mover position.

Clause 10. The storage compartment of clause 9, any other clause, or any combination of clauses, wherein the lever includes a fulcrum portion that is coupled to the printed circuit board at the pivot axis, a load arm located in spaced apart relation to the fulcrum portion and engaged with the lock-unit transmission to provide an output load to the lock-unit transmission to change the lock-unit transmission from the first position and the second position, and a lever arm located between the fulcrum portion and the load arm and coupled to the shape-memory alloy wire to receive an input force applied by the shape-memory alloy wire in response to the shape-memory alloy wire changing from the first length to the relatively shorter second length.

Clause 11. The storage compartment of clause 10, any other clause, or any combination of clauses, wherein the shape-memory alloy wire includes a first end coupled to the printed circuit board, a second end located in spaced apart relation to the first end and coupled to the printed circuit board, and a middle section arranged to extend between the first end, the second end, and the lever arm.

Clause 12. The storage compartment of clause 10, any other clause, or any combination of clauses, wherein the printed circuit board has a first side and a second side opposite the first side.

Clause 13. The storage compartment of clause 12, any other clause, or any combination of clauses, wherein the fulcrum portion of the lever is coupled to the first side of the printed circuit board.

Clause 14. The storage compartment of clause 13, any other clause, or any combination of clauses, wherein the shape-memory alloy wire is coupled to the second side of the printed circuit board.

Clause 15. The storage compartment of clause 14, any other clause, or any combination of clauses, wherein the lever arm extends through an aperture formed in the printed circuit board and is coupled to the shape-memory alloy wire.

Clause 16. The storage compartment of clause 9, any other clause, or any combination of clauses, wherein the control system includes a power supply coupled to the printed circuit board and configured to provide a predetermined amount of power to the shape-memory alloy wire to change the shape-memory alloy wire from the first length to the relatively smaller second length and a controller coupled to the power supply and configured to receive the input and provide a first signal to the power supply to provide the predetermined amount of power to the shape-memory alloy wire.

Clause 17. The storage compartment of clause 16, any other clause, or any combination of clauses, wherein the shape-memory alloy wire has a first end coupled to an electromechanical end stop included in the printed circuit board.

Clause 18. The storage compartment of clause 17, any other clause, or any combination of clauses, wherein a portion of the lever is configured to contact the electromechanical end stop when the lever is in the second mover positon.

Clause 19. The storage compartment of clause 18, any other clause, or any combination of clauses, wherein controller is configured to provide a second signal to the power supply to stop providing the predetermined amount of power to the shape-memory alloy wire when the portion of the lever contacts the electromechanical end stop of the printed circuit board.

Clause 20. The storage compartment of clause 9, any other clause, or any combination of clauses, wherein the latch further includes a second lock-unit coupled to the container to move relative to the container and the lock-unit transmission is arranged to extend between and interconnect the first lock-unit and the second lock-unit to cause movement of the first lock-unit to be transmitted to the second lock-unit.

Clause 21. The storage compartment of clause 20, any other clause, or combination of clauses, wherein the first lock-unit and the second lock-unit move in a third direction along the lateral axis from the first position to the second position when the shape-memory alloy wire changes from the first length to the relatively smaller second length.

Clause 22. The storage compartment of clause 21, any other clause, or any combination of clauses, wherein the latch further includes a latch spring arranged to extend between and interconnect the container and the latch and configured to provide a second bias force to the latch to urge the latch in a fourth direction opposite the third direction along the lateral axis to cause the latch to move toward the first position.

Clause 23. The storage compartment of clause 7, any other clause, or any combination of clauses, wherein the lever includes a fulcrum portion that is coupled to the printed circuit board at the pivot axis, a load arm located in spaced apart relation to the fulcrum portion and engaged with the lock-unit transmission to provide an output load to the lock-unit transmission to change the lock-unit transmission from the first position and the second position, and a lever arm located between the fulcrum portion and the load arm and coupled to the shape-memory alloy wire to receive an input force applied by the shape-memory alloy wire in response to the shape-memory alloy wire changing from the first length to the relatively shorter second length.

Clause 24. The storage compartment of clause 23, any other clause, or any combination of clauses, wherein the output load applied by the load arm of the lever to the lock-unit transmission is greater than the input force applied by the shape-memory alloy wire to the lever arm of the lever.

Clause 25. The storage compartment of clause 23, any other clause, or any combination of clauses, further comprising, wherein the output load is about 25 Newtons.

Clause 26. A storage compartment comprising a storage box adapted to be coupled to a vehicle in a fixed position relative to the vehicle, the storage box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture.

Clause 27. The storage compartment of clause 26, any other clause, or any combination of clauses, further comprising a latch coupled to the container to change between a locked configuration in which movement of the lid from the closed position is blocked and an unlocked configuration in which movement of the lid from the closed position is permitted.

Clause 28. The storage compartment of clause 27, any other clause, or any combination of clauses, further comprising an actuator engaged with the latch to cause the latch to change between the locked and unlocked configurations in response to an input.

Clause 29. The storage compartment of clause 28, any other clause, or any combination of clauses, wherein the actuator includes a printed circuit board, a transmission mover coupled to the printed circuit board to move relative to the printed circuit board and engaged with the latch to cause the latch to move between the locked and unlocked configurations, and a control system coupled to the printed circuit board and configured to apply power to the transmission mover to cause the transmission mover to change the latch between the locked and unlocked configurations along a lateral axis of the latch in response to receipt of the input to the control system.

Clause 30. The storage compartment of clause 29, any other clause, or any combination of clauses, wherein the transmission mover includes a lever coupled to the printed circuit board and arranged to extend toward the latch to engage the latch, the lever configured to pivot relative to the printed circuit board about a pivot axis that is perpendicular to the lateral axis.

Clause 31. The storage compartment of clause 30, any other clause, or any combination of clauses, wherein the transmission mover further includes a shape-memory alloy wire arranged to extend between and interconnect the printed circuit board and the lever and configured to pivot the lever about the pivot axis in response to changes in length of the shape-memory alloy wire between a first length associated with the locked configuration and a relatively smaller second length associated with the unlocked configuration in response to receipt of power supplied from the control system.

Clause 32. The storage compartment of clause 31, any other clause, or any combination of clauses, wherein the lever includes a fulcrum portion that is coupled to the printed circuit board at the pivot axis.

Clause 33. The storage compartment of clause 32, any other clause, or any combination of clauses, wherein the lever further includes a load arm located in spaced apart relation to the fulcrum portion and engaged with the transmission mover to provide a force load to the latch to change the latch from the locked configuration to the unlocked configuration.

Clause 34. The storage compartment of clause 33, any other clause, or any combination of clauses, wherein the lever further includes a lever arm located between the fulcrum portion and the load arm and coupled to the shape-memory alloy wire to receive an input force applied by the shape-memory alloy wire in response to the shape-memory alloy wire changing from the first length to the relatively shorter second length.

Clause 35. The storage compartment of clause 34, any other clause, or any combination of clauses, wherein the lever is configured to apply an output load to the latch.

Clause 36. The storage compartment of clause 35, any other clause, or any combination of clauses, wherein the output load is greater than the input force applied by the shape-memory alloy wire.

Clause 37. The storage compartment of clause 34, any other clause, or any combination of clauses, wherein the lever pivots in a first direction about the pivot axis from the locked configuration to the unlocked configuration when the shape-memory alloy wire changes from the first length to the relatively smaller second length.

Clause 38. The storage compartment of clause 37, any other clause, or any combination of clauses, wherein the transmission mover further includes an actuator spring arranged to extend between and interconnect the printed circuit board and the lever and configured to provide a first bias force to the lever to urge the lever in a second direction opposite the first direction to cause the transmission mover to move toward the locked configuration.

Clause 39. The storage compartment of clause 36, any other clause, or any combination of clauses, wherein the latch includes at least one lock-unit coupled to the container to move relative to the container along a lateral axis between a first position in which movement of the lid relative to the container is blocked when the lid is in the closed position and a second position in which movement of the lid away from the container is permitted.

Clause 40. The storage compartment of clause 39, any other clause, or any combination of clauses, wherein the latch further includes a latch spring arranged to extend between and interconnect the container and the at least one lock-unit and configured to provide a second bias force to the at least one lock-unit to urge the at least one lock-unit to move toward the first position.

Clause 41. The storage compartment of clause 34, any other clause, or any combination of clauses, wherein the shape-memory alloy wire includes a first end coupled to the printed circuit board, a second end located in spaced apart relation to the first end and coupled to the printed circuit board, and a middle section arranged to extend between the first end, the second end, and the lever arm.

Clause 42. The storage compartment of clause 41, any other clause, or any combination of clauses, wherein the printed circuit board has a first side and a second side opposite the first side.

Clause 43. The storage compartment of clause 42, any other clause, or any combination of clauses, wherein the fulcrum portion of the lever is coupled to the first side of the printed circuit board, the shape-memory alloy wire is coupled to the second side of the printed circuit board, and the lever arm extends through an aperture formed in the printed circuit board and is coupled to the shape-memory alloy wire.

Clause 44. The storage compartment of clause 31, any other clause, or any combination of clauses, wherein the control system includes a power supply coupled to the printed circuit board and configured to provide a predetermined amount of power to the shape-memory alloy wire to change the shape-memory alloy wire from the first length to the relatively smaller second length and a controller coupled to the power supply and configured to receive the input and provide a first signal to the power supply to provide the predetermined amount of power to the shape-memory alloy wire.

Clause 45. The storage compartment of clause 44, any other clause, or any combination of clauses, wherein the shape-memory alloy wire has a first end coupled to an electromechanical end stop included in the printed circuit board.

Clause 46. The storage compartment of clause 45, any other clause, or any combination of clauses, wherein a portion of the lever is configured to contact the electromechanical end stop when the lever pivots about the pivot axis to change the latch from the first position to the second position.

Clause 47. The storage compartment of clause 46, any other clause, or any combination of clauses, wherein the controller is configured to provide a second signal to the power supply to stop providing the predetermined amount of power to the shape-memory alloy wire when the portion of the lever contacts the electromechanical end stop of the printed circuit board.

Clause 48. A storage compartment comprising
a storage box adapted to be coupled to a vehicle in a fixed position relative to the vehicle, the storage box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture.

Clause 49. The storage compartment of clause 48, any other clause, or any combination of clauses, further comprising a latch including first lock-unit coupled to the container to move relative to the container, a second lock-unit coupled to the container to move relative to the container, and a lock-unit transmission arranged to extend between and interconnect the first lock-unit and the second lock-unit to cause movement of the first lock-unit to be transmitted to the second lock-unit.

Clause 50. The storage compartment of clause 49, any other clause, or any combination of clauses, wherein the first and second lock-units are moveable between a first position in which movement of the lid relative to the container is blocked when the lid is in the closed position and a second position in which movement of the lid away from the container is permitted.

Clause 51. The storage compartment of clause 48, any other clause, or any combination of clauses, further comprising an actuator engaged with the lock-unit transmission and configured to cause the lock-unit transmission to move the first and second lock-units between the first position and the second position in response to an input.

Clause 52. The storage compartment of clause 51, any other clause, or any combination of clauses, wherein the actuator includes a printed circuit board, a transmission mover coupled to the printed circuit board to move relative to the printed circuit board and engaged with the lock-unit transmission to cause the lock-unit transmission to move between the first position and the second position, and a control system coupled to the transmission mover and configured to apply power to the transmission mover to cause the transmission mover to change between a first mover position associated with the first position of the first and second lock-units and a second mover position associated with the second position of the first and second lock-units along a lateral axis of the latch in response to receipt of the input to the control system.

Clause 53. The storage compartment of clause 52, any other clause, or any combination of clauses, wherein the transmission mover includes a lever coupled to the printed circuit board and arranged to extend toward the lock-unit transmission to engage the lock-unit transmission, the lever configured to pivot relative to the printed circuit board about a pivot axis that is perpendicular to the lateral axis.

Clause 54. The storage compartment of clause 53, any other clause, or any combination of clauses, wherein the transmission mover further includes a shape-memory alloy wire arranged to extend between and interconnect the printed circuit board and the lever and configured to pivot the lever about the pivot axis in response to changes in length of the shape-memory alloy wire between a first length associated with the first mover position and a relatively smaller second length associated with the second mover position in response to the receipt of power supplied from the control system.

Clause 55. The storage compartment of clause 54, any other clause, or any combination of clauses, wherein the lever pivots in a first direction about the pivot axis from the first mover position to the second mover position when the shape-memory alloy wire changes from the first length to the relatively smaller second length.

Clause 56. The storage compartment of clause 55, any other clause, or any combination of clauses, wherein the transmission mover further includes an actuator spring arranged to extend between and interconnect the printed circuit board and the lever and configured to provide a first bias force to the lever to urge the lever in a second direction opposite the first direction to cause the transmission mover to move toward the first mover position.

Clause 57. The storage compartment of clause 56, any other clause, or any combination of clauses, wherein the first lock-unit and the second lock-unit move in a third direction along the lateral axis from the first position to the second position when the shape-memory alloy wire changes from the first length to the relatively smaller second length.

Clause 58. The storage compartment of clause 57, any other clause, or any combination of clauses, wherein the storage box is a glove box.

The invention claimed is:

1. A storage compartment comprising
a storage box adapted to be coupled to a vehicle in a fixed position relative to the vehicle, the storage box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture,
a latch including first lock-unit coupled to the container to move relative to the container and a rotatable lock-unit transmission coupled to the first lock-unit, the first lock-unit moveable between a first position in which movement of the lid relative to the container is blocked when the lid is in the closed position and a second position in which movement of the lid away from the container is permitted,
an actuator directly engaged with the lock-unit transmission and configured to cause the lock-unit transmission to move the first lock-unit between the first position and the second position in response to an input, the actuator including a printed circuit board, a transmission mover coupled to the printed circuit board to move relative to the printed circuit board and engaged with the lock-unit transmission to cause the lock-unit transmission to move between the first position and the second position, and a control system coupled to the transmission mover and configured to apply power to the transmission mover to cause the transmission mover to change between a first mover position associated with the first position of the first lock-unit and a second mover position associated with the second position of the first lock-unit along a lateral axis of the latch in response to receipt of the input to the control system,
wherein the transmission mover includes (i) a lever coupled to the printed circuit board and arranged to extend toward the lock-unit transmission to engage the lock-unit transmission, the lever configured to pivot relative to the printed circuit board about a pivot axis that is perpendicular to the lateral axis (ii) a shape-memory alloy wire arranged to extend between and interconnect the printed circuit board and the lever and configured to pivot the lever about the pivot axis in response to changes in length of the shape-memory alloy wire between a first length associated with the first mover position and a relatively smaller second length associated with the second mover position in response to the receipt of power supplied from the control system.

2. The storage compartment of claim 1, wherein the lever pivots in a first direction about the pivot axis from the first mover position to the second mover position when the shape-memory alloy wire changes from the first length to the relatively smaller second length, and wherein the transmission mover further includes an actuator spring arranged to extend between and interconnect the printed circuit board and the lever and configured to provide a first bias force to the lever to urge the lever in a second direction opposite the first direction to cause the transmission mover to move toward the first mover position.

3. The storage compartment of claim 2, wherein the lever includes a fulcrum portion that is coupled to the printed circuit board at the pivot axis, a load arm located in spaced apart relation to the fulcrum portion and engaged with the lock-unit transmission to provide an output load to the lock-unit transmission to change the lock-unit transmission from the first position and the second position, and a lever arm located between the fulcrum portion and the load arm and coupled to the shape-memory alloy wire to receive an input force applied by the shape-memory alloy wire in response to the shape-memory alloy wire changing from the first length to the relatively shorter second length.

4. The storage compartment of claim 3, wherein the shape-memory alloy wire includes a first end coupled to the printed circuit board, a second end located in spaced apart relation to the first end and coupled to the printed circuit board, and a middle section arranged to extend between the first end, the second end, and the lever arm.

5. The storage compartment of claim 3, wherein the printed circuit board has a first side and a second side opposite the first side and wherein the fulcrum portion of the lever is coupled to the first side of the printed circuit board, the shape-memory alloy wire is coupled to the second side of the printed circuit board, and the lever arm extends through an aperture formed in the printed circuit board and is coupled to the shape-memory alloy wire.

6. The storage compartment of claim 2, wherein the control system includes a power supply coupled to the printed circuit board and configured to provide a predetermined amount of power to the shape-memory alloy wire to change the Shape-memory alloy wire from the first length to the relatively smaller second length and a controller coupled to the power supply and configured to receive the input and provide a first signal to the power supply to provide the predetermined amount of power to the shape-memory alloy wire.

7. The storage compartment of claim 6, wherein the shape-memory alloy wire has a first end coupled to an electromechanical end stop included in the printed circuit board, a portion of the lever is configured to contact the electromechanical end stop when the lever is in the second mover positon, and the controller is configured to provide a second signal to the power supply to stop providing the predetermined amount of power to the shape-memory alloy wire when the portion of the lever contacts the electromechanical end stop of the printed circuit board.

8. The storage compartment of claim 2, wherein the latch further includes a second lock-unit coupled to the container to move relative to the container and the lock-unit transmission is arranged to extend between and interconnect the first lock-unit and the second lock-unit to cause movement of the first lock-unit to be transmitted to the second lock-unit, wherein the first lock-unit and the second lock-unit move in a third direction along the lateral axis from the first position to the second position when the shape-memory alloy wire changes from the first length to the relatively smaller second length, and wherein the latch further includes a latch spring arranged to extend between and interconnect the container and the latch and configured to provide a second bias force to the latch to urge the latch in a fourth direction opposite the third direction along the lateral axis to cause the latch to move toward the first position.

9. The storage compartment of claim 1, the lever includes a fulcrum portion that is coupled to the printed circuit board at the pivot axis, a load arm located in spaced apart relation to the fulcrum portion and engaged with the lock-unit transmission to provide an output load to the lock-unit transmission to change the lock-unit transmission from the first position and the second position, and a lever arm located between the fulcrum portion and the load arm and coupled to the shape-memory alloy wire to receive an input force applied by the shape-memory alloy wire in response to the shape-memory alloy wire changing from the first length to the relatively shorter second length.

10. The storage compartment of claim 9, wherein the output load applied by the load arm of the lever to the lock-unit transmission is greater than the input force applied by the shape-memory alloy wire to the lever arm of the lever.

11. The storage compartment of claim 9, wherein the output load is about 25 Newtons.

12. A storage compartment comprising
a storage box adapted to be coupled to a vehicle in a fixed position relative to the vehicle, the storage box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture,
a latch coupled to the container to change between a locked configuration in which movement of the lid from the closed position is blocked and an unlocked configuration in which movement of the lid from the closed position is permitted, and
an actuator directly engaged with a rotatable lock-unit transmission of the latch to cause the latch to change between the locked and unlocked configurations in response to an input, the actuator including a printed circuit board, a transmission mover coupled to the printed circuit board to move relative to the printed circuit board and engaged with the latch to cause the latch to move between the locked and unlocked configurations, and a control system coupled to the printed circuit board and configured to apply power to the transmission mover to cause the transmission mover to change the latch between the locked and unlocked configurations along a lateral axis of the latch in response to receipt of the input to the control system,
wherein the transmission mover includes (i) a lever coupled to the printed circuit board and arranged to extend toward the latch to engage the latch, the lever configured to pivot relative to the printed circuit board about a pivot axis that is perpendicular to the lateral axis and (ii) a shape-memory alloy wire arranged to extend between and interconnect the printed circuit board and the lever and configured to pivot the lever about the pivot axis in response to changes in length of the shape-memory alloy wire between a first length associated with the locked configuration and a relatively smaller second length associated with the unlocked configuration in response to receipt of power supplied from the control system.

13. The storage compartment of claim 12, wherein the lever includes a fulcrum portion that is coupled to the printed circuit board at the pivot axis, a load arm located in spaced apart relation to the fulcrum portion and engaged with the transmission mover to provide a force load to the latch to change the latch from the locked configuration to the unlocked configuration, and a lever arm located between the fulcrum portion and the load arm and coupled to the shape-memory alloy wire to receive an input force applied by the shape-memory alloy wire in response to the shape-memory alloy wire changing from the first length to the relatively shorter second length.

14. The storage compartment of claim 13, wherein the lever is configured to apply an output load to the latch and the output load is greater than the input force applied by the shape-memory alloy wire.

15. The storage compartment of claim 13, wherein the lever pivots in a first direction about the pivot axis from the locked configuration to the unlocked configuration when the shape-memory alloy wire changes from the first length to the relatively smaller second length, and wherein the transmission mover further includes an actuator spring arranged to extend between and interconnect the printed circuit board and the lever and configured to provide a first bias force to the lever to urge the lever in a second direction opposite the first direction to cause the transmission mover to move toward the locked configuration.

16. The storage compartment of claim 14, wherein the latch includes at least one lock-unit coupled to the container to move relative to the container along a lateral axis between a first position in which movement of the lid relative to the container is blocked when the lid is in the closed position and a second position in which movement of the lid away from the container is permitted and a latch spring arranged to extend between and interconnect the container and the at least one lock-unit and configured to provide a second bias force to the at least one lock-unit to urge the at least one lock-unit to move toward the first position.

17. The storage compartment of claim 13, wherein the shape-memory alloy wire includes a first end coupled to the printed circuit board, a second end located in spaced apart relation to the first end and coupled to the printed circuit board, and a middle section arranged to extend between the first end, the second end, and the lever arm.

18. The storage compartment of claim 17, wherein the printed circuit board has a first side and a second side opposite the first side and wherein the fulcrum portion of the lever is coupled to the first side of the printed circuit board, the shape-memory alloy wire is coupled to the second side of the printed circuit board, and the lever arm extends through an aperture formed in the printed circuit board and is coupled to the shape-memory alloy wire.

19. The storage compartment of claim 12, wherein the control system includes a power supply coupled to the printed circuit board and configured to provide a predetermined amount of power to the shape-memory alloy wire to change the Shape-memory alloy wire from the first length to the relatively smaller second length and a controller coupled to the power supply and configured to receive the input and provide a first signal to the power supply to provide the predetermined amount of power to the shape-memory alloy wire.

20. The storage compartment of claim 19, wherein the shape-memory alloy wire has a first end coupled to an electromechanical end stop included in the printed circuit board, a portion of the lever is configured to contact the electromechanical end stop when the lever pivots about the pivot axis to change the latch from the first position to the second position, and the controller is configured to provide a second signal to the power supply to stop providing the predetermined amount of power to the shape-memory alloy wire when the portion of the lever contacts the electromechanical end stop of the printed circuit board.

* * * * *